United States Patent [19]

Coleman

[11] 4,060,649
[45] Nov. 29, 1977

[54] PAINT CURTAIN MACHINE AND METHOD OF PAINTING

[75] Inventor: James H. Coleman, Wichita Falls, Tex.

[73] Assignee: Sprague Electric Company, North Adams, Mass.

[21] Appl. No.: 748,075

[22] Filed: Dec. 6, 1976

[51] Int. Cl.² ............... B05C 5/00; B05D 1/30; H01G 13/00
[52] U.S. Cl. .................. 427/79; 118/DIG. 4; 427/420
[58] Field of Search ............. 118/DIG. 4, 324, 325; 427/420, 79, 80; 53/140

[56] References Cited

U.S. PATENT DOCUMENTS

| 3,205,089 | 9/1965 | Kinzelman | 427/420 |
| 3,717,121 | 2/1973 | Bruckbauer et al. | 118/DIG. 4 |
| 3,984,902 | 10/1976 | Prazak | 118/DIG. 4 |
| 4,019,906 | 4/1977 | Ridley | 118/DIG. 4 |

FOREIGN PATENT DOCUMENTS

| 727,567 | 2/1966 | Canada | 427/420 |
| 707,611 | 6/1941 | Germany | 118/DIG. 4 |
| 908,653 | 10/1962 | United Kingdom | 118/DIG. 4 |
| 1,086,301 | 10/1967 | United Kingdom | 427/420 |

*Primary Examiner*—Morris Kaplan
*Attorney, Agent, or Firm*—Connolly and Hutz

[57] ABSTRACT

A paint curtain machine for coating a substrate with paint has a fix mounted guide plate at either edge of the curtain for guiding and determining the edges of the falling paint curtain that otherwise tends to draw together and pour or at least to wrinkle and produce uneven paint coatings. The inner edges of the guide plates to which the paint curtain edges cling by capillarity are sloped inwardly toward the bottom of the curtain. Excess paint falling outside the left and right edges of the paint curtain fall about straight down the faces of the guide plates leaving a region of those faces dry adjacent the paint curtain. A highly uniform thickness of the paint curtain is realized permitting the attainment of thinner paint curtains having a high resistance to tearing. This system and method are especially advantageous in making thin ceramic dielectric layers in the production of monolithic ceramic capacitors.

15 Claims, 7 Drawing Figures

PAINT CURTAIN MACHINE AND METHOD OF PAINTING

BACKGROUND OF THE INVENTION

This invention relates to paint curtain machines for coating a substrate with a fluid paint and more particularly to such machines wherein the paint is a dielectric ceramic precursor and the paint machine is adapted for use in the manufacture of monolithic ceramic capacitors.

Paint curtain machines are known wherein paint is discharged from a paint reservoir to form a continuously falling sheet or curtain of paint. A substrate material is passed through the falling curtain and a layer of paint is deposited on the top surface of the substrate. The faster the substrate is passed through the curtain or the thinner the curtain itself, then the thinner the substrate coating becomes. Excess paint from the curtain is captured in a collector pan under the line of passage of the substrate and is pumped back up into the paint reservoir. The rate of pumping determines and is about proportional to the thickness of the paint curtain.

Such paint curtain machines are particularly well suited to a high speed process for continuously painting either a long continuous sheet substrate material, or for sequentially painting a series of discrete substrates that are carried through the curtain on a conveyor.

As an example of the former, a cloth or fabric is continuously passed through a curtain of opaque paint in the manufacture of window shades.

An example of the latter consists in the method of making monolithic ceramic capacitors wherein discrete substrates of porous paper or cardboard are repeatedly passed through a ceramic precursor paint with electrode films being deposited between some of the successive paint layers. The ceramic paint layers are heated to remove the solvent and the final stack of dried paint layers with electrodes buried therein is diced into individual capacitor units and fired to maturity. Such a process is described in U.S. Pat. No. 3,717,487, issued Feb. 20, 1973 and assigned to the same assignee.

The paint curtain formed in such machines is desirably thin but such thin falling curtains tend to draw together from the line of departure or discharge from the paint reservoir so that unless the discharge line is very long, the paint pours onto a substrate in a central stream. To prevent this drawing or gathering of the paint curtain, it has become conventional to hang either a bead chain or a straight bar from the reservoir in the curtain and near each end of the discharge line. These two bead chains or two hanging bars reduce the drawing together of the falling curtain although they themselves are pulled by the paint so that they hang with a bias toward the vertical center line of the curtain. These chains or bars are sometimes called curtain stretchers.

However, in the vicinity of the hanging chains or bars the curtain contains wrinkles that produce alternate stripes of thick and thin regions in the substrate paint coating which is particularly objectionable in a dielectric layer of a capacitor. Moreover, it becomes more difficult to form a paint curtain with a broad wrinkle-free central region as the paint pumping rate is further reduced to provide an even thinner curtain and thus a thinner dielectric coating for a fixed speed of passage of the substrates. Not only are wrinkles more pronounced in thinner curtains, but now the curtain is more easily "torn" when the machine is inadvertently bumped or vibrated or when there is a breeze in the ambient air. Such tears usually occur in the wrinkled region of the curtain where the curtain is alternatively abnormally thick and thin. The tears often become wide enough to extend 6 inches or more from the edge of the curtain toward the center or even to cause the curtain to break completely and degenerate into a random series of drops and streams.

As an alternative to thinning the paint curtain to obtain a thinner paint coating on the substrate, the speed of passage of the substrate through the curtain may be increased. This technique is limited by the tendency for defects of yet another kind to be formed in the substrate coating, the density of such coating defects increasing with increasing speed of the substrates. Even minor discontinuities in the substrate surface, such as those occurring at the to-be-buried electrode film edges of a monolithic ceramic capacitor under construction, cause the paint coating to skip in these regions when the substrate speed through the thin curtain is too high. Although the paint coating subsequently tends to level, thin or even bare regions in the coating still remain and at best become regions of low dielectric strength.

Thus, both techniques for obtaining a thinner paint coating are limited in practice so that highly uniform ceramic dielectric films less thin than about 0.002 inches cannot be made with high yields using paint curtain machines known heretofore.

It is therefore an object of this invention to provide an improved paint curtain machine that is capable of providing a thin substantially wrinkle free falling paint curtain.

It is a further object of this invention to provide a paint curtain machine that is capable of producing a thin falling paint curtain that is more stable and less subject to tearing due to wind or to bumps imparted to the machine.

It is yet a further object of this invention to provide a means and a method for depositing highly uniform dielectric films with high yields, such films having a thickness of about 0.001 inch or less.

It is still a further object of this invention to provide a method for making reliable thin ceramic films for use as the dielectric material in a monolithic ceramic capacitor.

SUMMARY OF THE INVENTION

A paint curtain machine for coating a substrate with a fluid paint of the type having a paint reservoir from which a paint curtain is caused to fall on a moving substrate to be painted includes two fixedly mounted members each having a planar surface extending from spaced points along the line of discharge of the falling paint. The surfaces face and slope downwardly toward each other. The machine also includes a means for diverting and spacing from the curtain the excess paint falling from the line of discharge outwardly of the curtain. In a preferred embodiment, two plates are provided for guiding and determining the edges of the paint curtain as well as for diverting the excess paint. The plates are fixedly mounted so that a right and a left edge of the falling paint curtain runs down and adheres by capillarity to a planar edge of one and the other of the two plates, respectively. A major surface of each of the two plates is essentially in the plane of the falling paint curtain and the facing guiding edges of the two plates, respectively, are continuously and progressively closer to each other toward their bottoms. The term planar as used herein is defined as a surface that is flat or is gently curved, the radii of such curvatures being greater than about 0.100 inches and preferably more than 1.0 inches.

The method for painting a surface of the substrate includes establishing the falling paint curtain, holding the two guide plates at either edge of the falling paint curtain and adjusting the positions of the plates while maintaining a major surface of each essentially within the plane of the curtain so that an edge of one and of the other of the plates face each other and are progressively closer to each other toward their bottoms. Capillarity is established between the falling curtain and the facing plate edges to guide and determine the edges of the falling paint curtain. The angle between each facing plate edge and a verticle line is adjusted to minimize abnormally thick and thin regions in the curtain. In other words, the curtain thickness is made optimally uniform over the entire curtain area. Depending on factors such as paint rheology and average thickness of the curtain, such optimum angles range from about 5° to 20°.

After so adjusting the guide plates they are fix mounted relative to the reservoir. A substrate is then passed through the curtain at a constant speed to deposit a highly uniform thin coating of paint on a top surface thereof. Uniform paint coatings of less than 0.0005 inches may be deposited in this manner.

A major reason for the greatly improved uniformity in thickness of the curtain and improved performance of paint curtain machines made in accordance with this invention is the effective separation of paint falling outside the edges of the paint curtain from the falling paint curtain itself. This machine and this method are particularly advantageous for depositing ceramic dielectric layers in the manufacture of monolithic ceramic capacitors.

DESCRIPTION OF THE PREFERRED EMBODIMENTS

Figure 1:
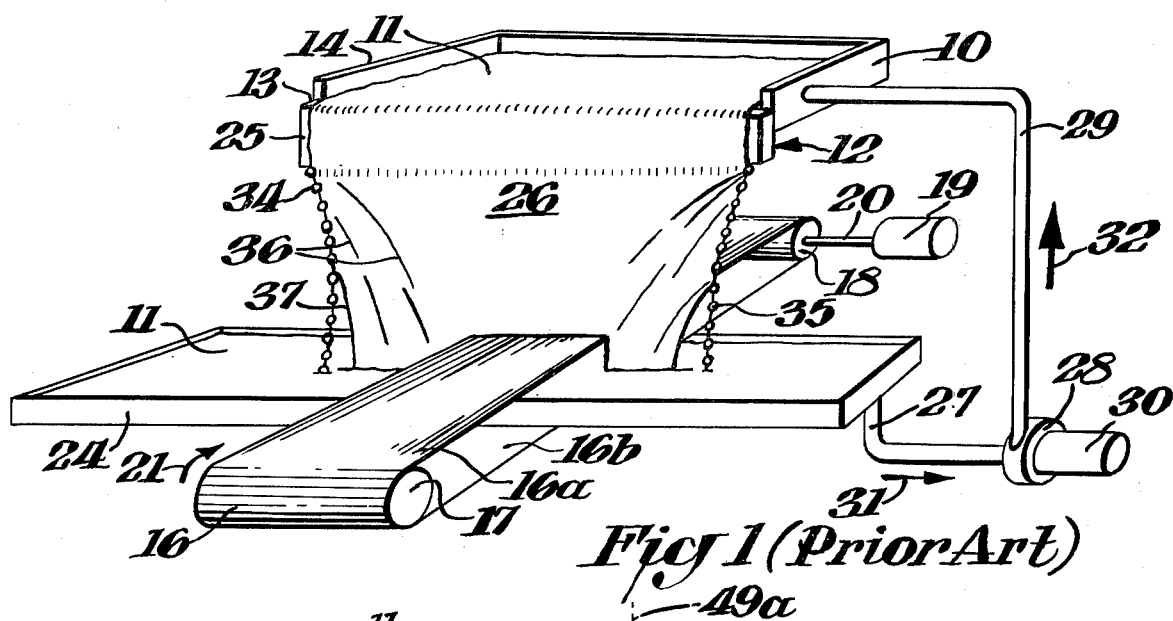
FIG. 1 shows in perspective view the essential features of a paint curtain machine of the prior art.

In the machine of the prior art shown in FIG. 1, a reservoir 10 containing paint 11 has a weir 12 that is a rectangular piece of stainless steel sheet. The weir 12 serves as one side of the reservoir and has a horizontal top edge 13 that is lower than the top edge 14 of the other sides of the reservoir. A top plate (not shown) may be mounted to the top edge 14 of the reservoir 10 to minimize evaporation of the volatiles from the paint and to prevent contamination by dust or other airborne particles.

An endless conveyor belt 16 is stretched and supported by idler spindle 17 and drive spindle 18. An electric motor 19 turns the drive spindle 18 being connected thereto by shaft 20. The top web 16a of the belt is substantially horizontal and moves in a direction shown by the arrow 21. Alternatively two such conveyor belts may be used, one on either side of the falling sheet, with top surfaces lying in about the same horizontal plane and being synchronously driven in the same direction. A paint return pan or trough 24 is mounted between the top (16a) and bottom (16b) webs of the belt 16. The paint 11 in the reservoir 10 is shown overflowing the weir 12, running down the vertical face 25 of the weir and falling from the bottom edge of the weir to form a falling paint curtain 26.

When substrates are placed on the front end of the belt 16, they are carried through the falling paint curtain 16 and are paint coated upon reaching the back end of the belt. The surplus paint from the paint curtain is collected in the return trough 24 and pumped out through pipe 27 through pump 25 and into the reservoir 10 by means of pipe 29. Electric motor 30 drives the pump 28. The direction of the paint flow in the pipes is shown by arrows 31 and 32.

As has been explained above, when the pumping rate is slowed to cause the curtain to become very thin, it tends to gather toward the center and pour onto the substrate below. Curtain stretching chains 34 and 35 are hung from the front of the bottom edge of the weir bar 12 to prevent the gathering and pouring of the curtain 26. Although the chains tend to be drawn in centrally at an angle of from 10° to 20° relative to their normal vertical hanging position they are effective in stretching the curtain and in providing a central curtain region that is relatively uniform and thin. Heavy wrinkles 36 radiate from the curtain corners as illustrated in FIG. 1. The curtain often pulls away completely from the chain part way down the curtain and in this region have an edge, such as left edge portion 37, not in contact with the chain. This usually represents an unstable condition leading to the non-self-correcting destruction of the curtain. As provided by this conventional machine, the thin relatively uniform central region of the curtain is the usable coating region spaced from the curtain edges at the chains by several inches, usually 6 inches or more. Thus, typically about a foot or more of the curtain width is not usable.

Other paint curtain machines do not employ a weir bar paint discharge means but rather have an essentially straight slot, sometimes of adjustable width, in the bottom of the reservoir. The paint either falls from the slot due to head pressure of the paint in the reservoir or the reservoir is closed in the region over the paint therein to permit application of air pressure in this region. The curtain thickness is thus capable of adjustment by regulating the air pressure or the discharge slot width or both. Curtain stretching chains or bars are conventionally hung from either end of the discharge opening in such machines. The principle of this invention may be applied in the modification of any of the above mentioned machines of the prior art.

Figure 2:
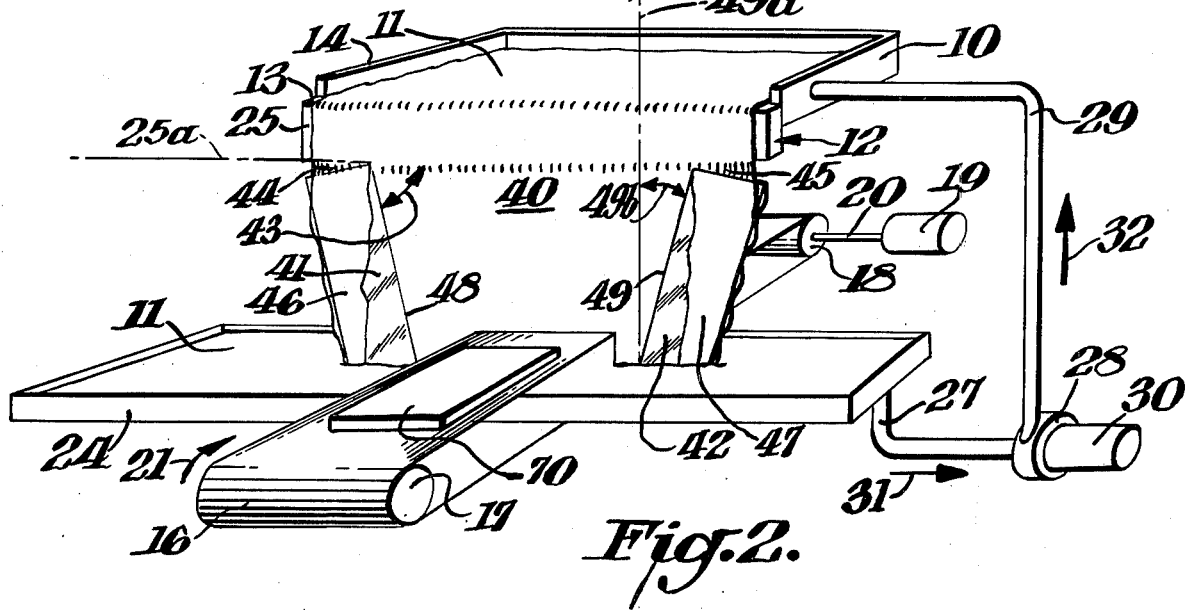
FIG. 2 shows in perspective view the essential features of a paint curtain machine of the present invention.

The basic elements of a curtain coating machine of the present invention is shown in FIG. 2. This improved machine differs essentially from the prior art machine of FIG. 1 only in the curtain stretching means employed. The falling paint curtain 40 is now bounded at the left and right sides, respectively, by two spaced curtain edge guide plates 41 and 42. These essentially rectangular guide plates each have a corner abutting the bottom edge of the weir bar 12 at two points being spaced inwardly of the extremities of the paint discharge line wherein the paint leaves the weir bar. This discrete paint discharge line 25a is slightly shorter than the weir bar 12 but is shown extended leftward in the drawing for clarity of exposition. The plates are tilted symmetrically so that for example the left curtain edge corresponding to an edge of the plate 41 is at an acute angle 43 with respect to the bottom edge of the weir bar 12. This acute angle generally corresponds to an acute angle of from 70° to 85° between the guiding edge of the plates and a horizontal plane such as the plane of the top surface of paint 11 in reservoir 10.

The paint falling from the outer face 25 of weir bar 12 from the line of discharge 25a in regions directly above the guide plates 41 and 42 bridge the gaps 44 and 45 between the weir bar and plates 41 and 42, respectively. From there this bridging paint continues to fall about straight down the front surfaces of plates 41 and 42 in regions 46 and 47, respectively. The left and right edges 48 and 49 of the curtain are drawn to and are guided along the sloped inner edges, respectively, of the guide plates 41 and 42. The front surfaces of plates 41 and 42 are left dry in the regions between the curtain 40 and the wet regions 46 and 47. The angle (e.g. 49b) of the flat surfaces of the curtain edges relative to a verticle line (e.g. 49a) as is determined by the slope of the tilted guide plate edges, has been found under most conditions to be optimum within the range of about 5° to 20° corresponding to the range of angles 70° to 85° in angle 43. The optimum angle in any given situation is determined by several factors such as the paint formulation and the thickness of the curtain. If the guiding edge surface 48 is other than flat such as being convex inwardly, the angle 43 is determined between the upper portion of this guiding edge surface 48 and the adjacent lower edge of the weir bar 12.

This feature of diverting excess paint falling from the weir outside the left and right edges of the paint curtain, and separating this excess paint 46 and 47 from the paint curtain 40 is found to be responsible to a large degree for the achievement of essentially wrinkle-free and stable paint curtains in machines of this invention. Furthermore, the excess paint being attracted to the plate surfaces by capillarity moves thickly, slowly and without substantial turbulence into the collector trough. The gaps 44 and 45 between guide plates and weir bar are preferred and help maintain the above noted paint separation. However, the gaps are not essential and the desired paint separation may be accomplished even with the upper edges of the guide plates abutting along their entire lengths the bottom of the weir bar.

The term paint discharge line as used herein is appropriate considering that the thickness of the paint curtain is much smaller than the thickness of the weir bar and the width of the guiding edges; therefore more literally correct terms, such as paint discharge band, is considered less useful in providing an effective word picture of the process.

The essential features of the paint curtain stretching and guiding system according to the principles of the present invention are therefore (a) two fixed solid surfaces facing each other and essentially facing the paint curtain, which surfaces extend from the line of discharge of the paint curtain from the reservoir and then slope downwardly and inwardly toward the curtain, and (b) a means for diverting and spacing from the curtain the excess paint falling from the line of discharge outwardly of the paint curtain.

The above said facing surface (a) corresponds for example to the left and guiding edge of guide plate 42; and the right hand region of the major surface of plate 42 to which excess paint 47 adheres corresponds to the above said excess paint diverting means (b) in the preferred embodiments. The solid surface (a) may for example be that of a taut band or a square bar. A smooth planar surface such as the guiding edge of the essentially right parallelepiped of plate 42 is believed to provide a more wrinkle free curtain than an irregular non-planar surface as in a chain, and the very simple guide plates of the preferred embodiment provide the dual functions (a) and (b) as shown in FIGS. 2 through 6 and are thus preferred.

Furthermore, it is preferred to employ an adjustable but fixed and rigidly mounted planar guiding surface (a) in order to obtain greater control over curtain wrinkles without depending upon the mass of the guide member and the distribution thereof along a loosely hinged member such as a chain or hinged bar, and in order to reduce the influence of machine vibrations or physical shock thereto which tend to tear the curtain.

Figures 3, 4, 5, 6, 7:
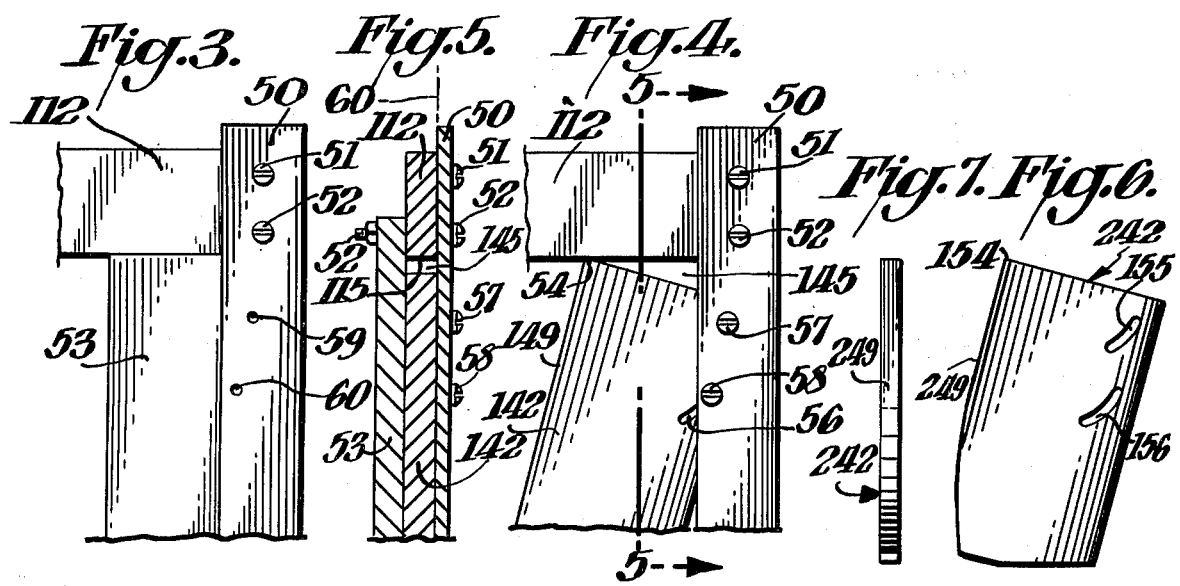
FIG. 3 shows in front view a detail of the machine of FIG. 2 partially assembled.
FIG. 4 shows in front view a detail of the same portion of the machine of FIG. 3 but completely assembled with a tilted right hand guide plate.
FIG. 5 shows a side sectional view of the detail of FIG. 4, taken in plane 5—5.
FIG. 6 shows the front major surface of a curtain edge guideplate being the same as that in FIG. 4 except the planar surface of the curtain guiding edge is convex toward the curtain rather than flat.
FIG. 7 shows in edge view the curtain edge guide plate of FIG. 6 wherein the planar surface of the guiding edge is in view.

In FIGS. 3 through 5 there are shown various details of a mounting means that is suitable for fastening the guide plates of FIG. 2 in proper relationship to the weir bar. Some of these details were omitted in FIG. 2 for greater clarity of the essential features of the machine. The numeral designations in the 100 series of the latter four figures were generated by adding 100 to the numerals corresponding to particular parts shown in FIG. 2. For example, the guide plate 142 in FIGS. 4 and 5 corresponds to the right hand guide plate 42 in FIG. 2.

In the detail of FIG. 3, a vertical mounting bar 50 is attached by two threaded screws 51 and 52 to the right hand side of and to the front of the weir bar 112. Also a plate 53 is attached to the right hand side of and to the back of the weir bar 112. Turning to FIGS. 4 and 5 a tiltable guide plate 142 having the same thickness as the weir bar 112 is partially sandwiched between the mounting bar 40 and the plate 53. A right angled corner 54 of the guide plate 142 abuts the bottom edge 115 of the weir bar 112. Two spaced slots 55 (not shown) and 56 each have a radius of curvature lying on a segment of a circle with a center at corner 54 so that when screws 57 and 58 are positioned in holes 59 and 60, respectively, and pass through slots 55 and 56, respectively, then the tilt angle of the guide plate 142 may be adjusted while the guide plate corner remains abutting the weir bar for any chosen angle of adjustment. The round holes 59 and 60 as well as the slots 55 and 56 may have a loose fit about the screws 57 and 58, respectively, but the screws 57 and 58 may be tightened into threaded holes (not shown) in the rear plate 53 to provide a fixed mounting of the tilted guide plate 142 at a selected angle.

The preferred procedure for adjusting the tilt or slope of the curtain guide plate edges in the machine of this invention is to establish the falling paint curtain and then to adjust the tilt or angle of each plate while maintaining the front surfaces of the guide plates within the plane 60 of the paint curtain, so that the region of the curtain immediately adjacent to the guide plate is free of wrinkles. Wrinkles are regions of abnormal thinness or thickness and are made especially visable by back lighting the curtain.

Monolithic ceramic capacitors are made using the paint curtain machine of this invention by employing a paint comprising ceramic powder (e.g. barium titanate) in an organic vehicle, and by repeatedly passing a substrate through the paint curtain. After each pass, the deposited layer is dried and an electroding film is deposited by screen printing to the dried layer. The stack of paint layers with buried electrode films is heated to burn off the organic vehicle and subsequently fired to mature the ceramic.

A paint curtain machine as described and illustrated in FIG. 1 was used to manufacture a large number of monolithic ceramic capacitors using the method described in the aforementioned patent U.S. Pat. No. 3,717,487. The curtain thickness and substrate speed were adjusted so the ceramic layers between electrodes were 0.001 inch thick. This machine was subsequently modified by removing the chains and substituting guide plates as illustrated in FIGS. 2 through 6. A large number of experimental monolithic capacitors were then made using the same materials and procedures except that the modified machine was used. It was found that by adjusting the paint pumping rate downward by about a factor of ½ and maintaining the belt speed the same, namely at about 2 feet per second, the resistance of the curtain to blowing and tearing was still greater in the modified machine while the dielectric thickness of the experimental capacitors produced thereby was about 0.0005 inch.

In further comparative tests it has been shown that using the old machine in the production of capacitors having a 0.001 inch dielectric layer, large area capacitor parts of ¼ square inch (area of the buried electrode films) had a yield of about 75% whereby losses were attributed to dielectric layer defects such abnormally thin regions causing failure in a standard voltage breakdown test. On the other hand, 0.001 inch dielectric layer capacitors made using the modified machine were made having electrode areas as large as 3 square inches and the same 75% yield to the same dielectric breakdown test. Furthermore, the curtain in the improved machine was almost completely resistant to tearing.

Yet a further benefit was realized, in that the substrate, such as substrate 70 as shown in FIG. 2, could be much wider since the curtain is uniform over nearly the entire curtain width. The substrate may pass within an inch or less of the curtain edges while a uniform coating is achieved. Thus the modified machine has a greater production capacity. Alternatively, a machine of this invention having the same production capacity of an old machine has a less wide weir bar and requires less paint for operation. Such a smaller machine is advantageous for short production runs and further results in reducing the paint vehicle evaporation rate.

The modified machine had a 0.05 inch thick weir bar and guide plates. When adjusted to provide about 0.001 inch or less thick dielectric layers, the rear (as shown) surfaces of the guide plates remain dry. Also, the greatest part of the curtain guiding edges of the guide plates remain dry, namely in the regions near the rear. Capillarity is apparently strong between the curtain and the corner of each guide plate that is formed between the guiding edge and the front major surface of the guide plate. The surface of the guiding edge is preferably at right angles to the front major surface and the surface of the guiding edge is preferably straight and flat as shown. However, some deviation from these conditions would clearly be operable and in fact it is hypothesized that the above defined corner angle may advantageously be oblique up to about 130° and the planar surfaces of the guiding edges of the guide plates such as guide plate 242 shown in FIG. 6 may be convex toward each other especially when the distance between the guide bar and the moving substrate exceeds two or three inches. The elements of guide plate 242 in FIGS. 6 and 7 are designated by numerals of corresponding elements of guide plate 142 shown in FIG. 5, to which numerals 100 are added.

What is claimed is:

1. In a paint curtain machine for coating a substrate with a fluid paint of the type having a paint reservoir from which a curtain of paint is caused to fall from a line of discharge at said reservoir onto a moving substrate to be painted, the improvement comprising two spaced plates each having a major surface that is essentially in the plane of said paint curtain and having a plate edge defining a planar surface extending from a point in said line of discharge and spaced inwardly of the extremity of said line of discharge, said planar surfaces facing one another and extending inwardly from said respective points and towards one another, said planar surfaces guiding the edges of said curtain therebetween which has been intercepted at said points, and the excess of said curtain from the line of discharge being diverted at said points.

2. A paint curtain machine for coating a substrate with a fluid paint comprising a paint reservoir, a paint discharge means for continuously discharging said paint from a line of discharge at said reservoir to cause said discharged paint to form a falling paint curtain, a substrate conveying means for moving a substrate to be painted through said falling paint curtain, two spaced plates each being fixedly mounted and each having an edge of planar surface extending from a point within said line of paint discharge, said two points being spaced inwardly of the extremities of said line of discharge, a major surface of each of said plates being essentially in the plane of said paint curtain and said planar edge of one of said plates facing said planar edge of the other of said plates, said facing plates each sloping inwardly toward each other and in a downward direction for the purpose of guiding and determining the edges of said paint curtain intercepted between said planar surfaces at said points and to substantially eliminate wrinkles in said intercepted falling paint curtain and the excess of said curtain from the line of discharge being diverted at said points.

3. The paint curtain machine of claim 2 wherein said paint discharge means is comprised of a rectangular bar being mounted on an open side portion of said reservoir and having a horizontal top edge that is lower than the top edges of the other sides of said reservoir, said bar serving as a weir over which said paint may flow and from which said paint may fall to form said falling paint curtain.

4. The paint curtain machine of claim 3 wherein the upper end of each of said planar guiding edges abuts the bottom edge of said weir bar.

5. The paint curtain machine of claim 4 wherein an upper edge of each of said guide plates is about at right angles to the adjacent of said planar guiding edges to provide two gaps outwardly of said two points, respectively, between said line of paint discharge and said upper edge of each of said two plates, respectively.

6. The paint curtain machine of claim 2 wherein said planar guiding edges are essentially flat.

7. The paint curtain machine of claim 2 wherein each of said inwardly sloping planar guiding edges at the uppermost portion thereof forms an angle in the plane of said curtain of from 70° to 85° with a horizontal plane.

8. The paint curtain machine of claim 7 additionally comprising an adjusting means for enabling the changing of said angle, and a means for subsequently effecting said fixed mounting of said guide plates.

9. In a method for coating a substrate with a fluid paint including providing a falling paint curtain by discharging a fluid paint from a line of discharge at a paint reservoir and moving said substrate through said falling paint curtain, the improvement comprising (a) fixedly mounting two members, each having a planar surface, with said two planar surfaces extending from two spaced points, respectively, within said line of discharge, said points being each spaced from an extremity of said line of discharge, said planar surfaces facing each other and extending from said line downwardly and sloping toward each other for guiding therebetween the portion of said discharged paint intercepted at said points; and (b) diverting at said points the excess paint falling from said line of discharge.

10. A method for painting a surface of a substrate comprising:
  a. providing a falling paint curtain by discharging a fluid paint from a paint reservoir;
  b. holding two plates spaced from one another and within said falling paint curtain, respectively;
  c. adjusting the positions of said plates while maintaining a major surface of each of said plates essentially within the plane of said paint curtain so that a planar guiding edge of one and of the other of said plates face each other and said facing edges each extend from a point spaced from a transverse extremity of the discharge curtain and are sloped inwardly and are progressively closer to each other toward the bottoms thereof and capillarity is established between the portion said falling curtain intercepted between said points and said facing plate edges to guide and determine said edges of said intercepted falling paint curtain and the excess of said discharged curtain being diverted at said points;
  d. fixedly mounting said adjusted plates; and
  e. moving a substrate through said paint curtain to coat said substrate with said paint.

11. The method of claim 10 wherein said adjusting is accomplished by changing the angle with respect to a verticle line of said facing edges of each of said plates; respectively, to minimize abnormally thick and thin regions in said curtain.

12. The method of claim 11 wherein said angle lies between 5° and 20° as measured between each facing plate edge and a verticle line.

13. The method of claim 11 wherein said minimum of abnormally thick and thin regions in said curtain is ascertained by observing said curtain from a front position while back lighting said curtain.

14. The method of claim 10 wherein said discharging is effected from said reservoir from an essentially straight edge of said reservoir defining a line of discharge.

15. The method of claim 10 wherein said fluid paint is comprised of a ceramic powder and an organic vehicle, said method additionally comprising moving said substrate through said curtain a plurality of times to deposit a plurality of stacked layers of said paint, depositing between at least some of said layers an electroding metal film, heating to burn off said organic vehicle, and firing said ceramic to maturity to provide a monolithic ceramic capacitor.

* * * * *